Nov. 29, 1932.　　　L. K. HOSS　　　1,889,068
LUBRICATOR
Filed Sept. 5, 1931　　5 Sheets-Sheet 2
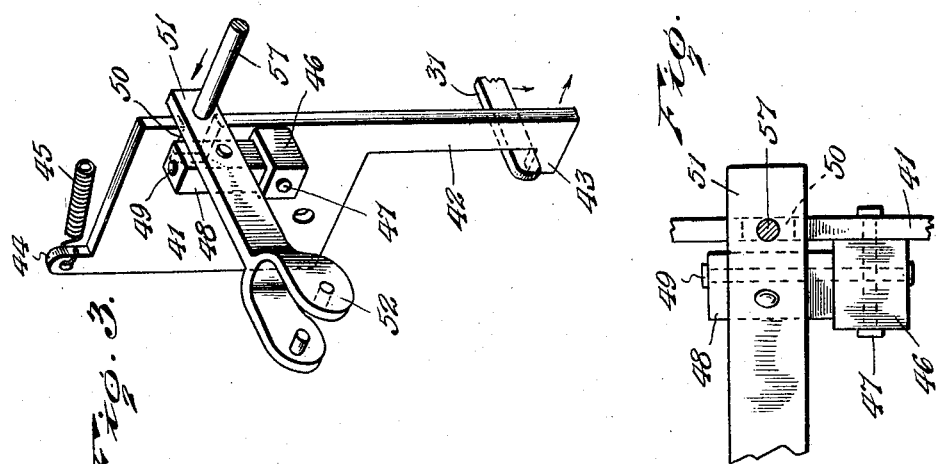
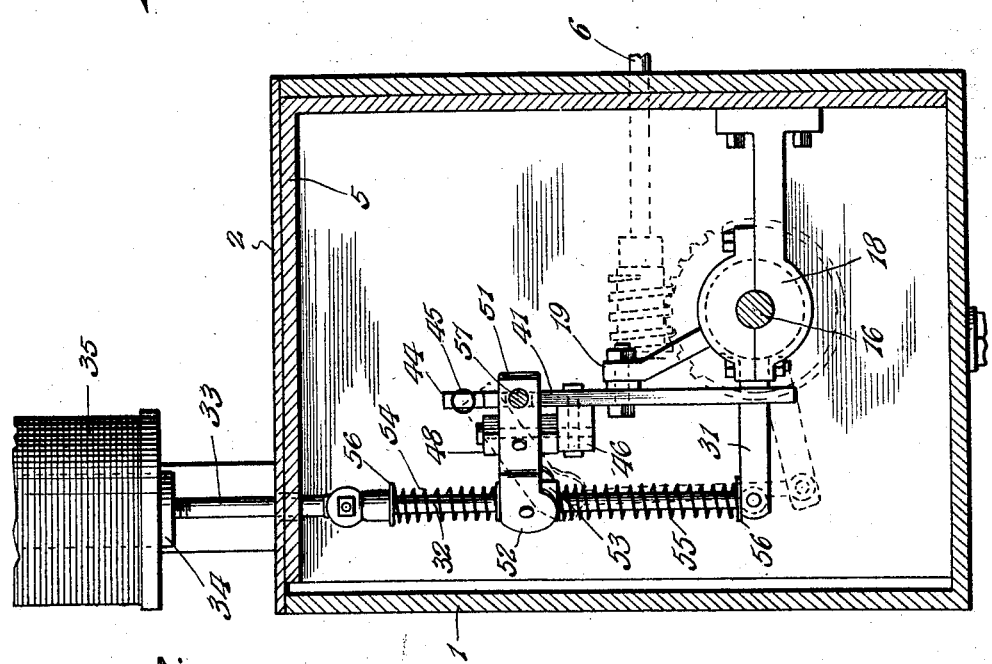
Inventor
L. K. Hoss.
By Lacey & Lacey,
Attorneys

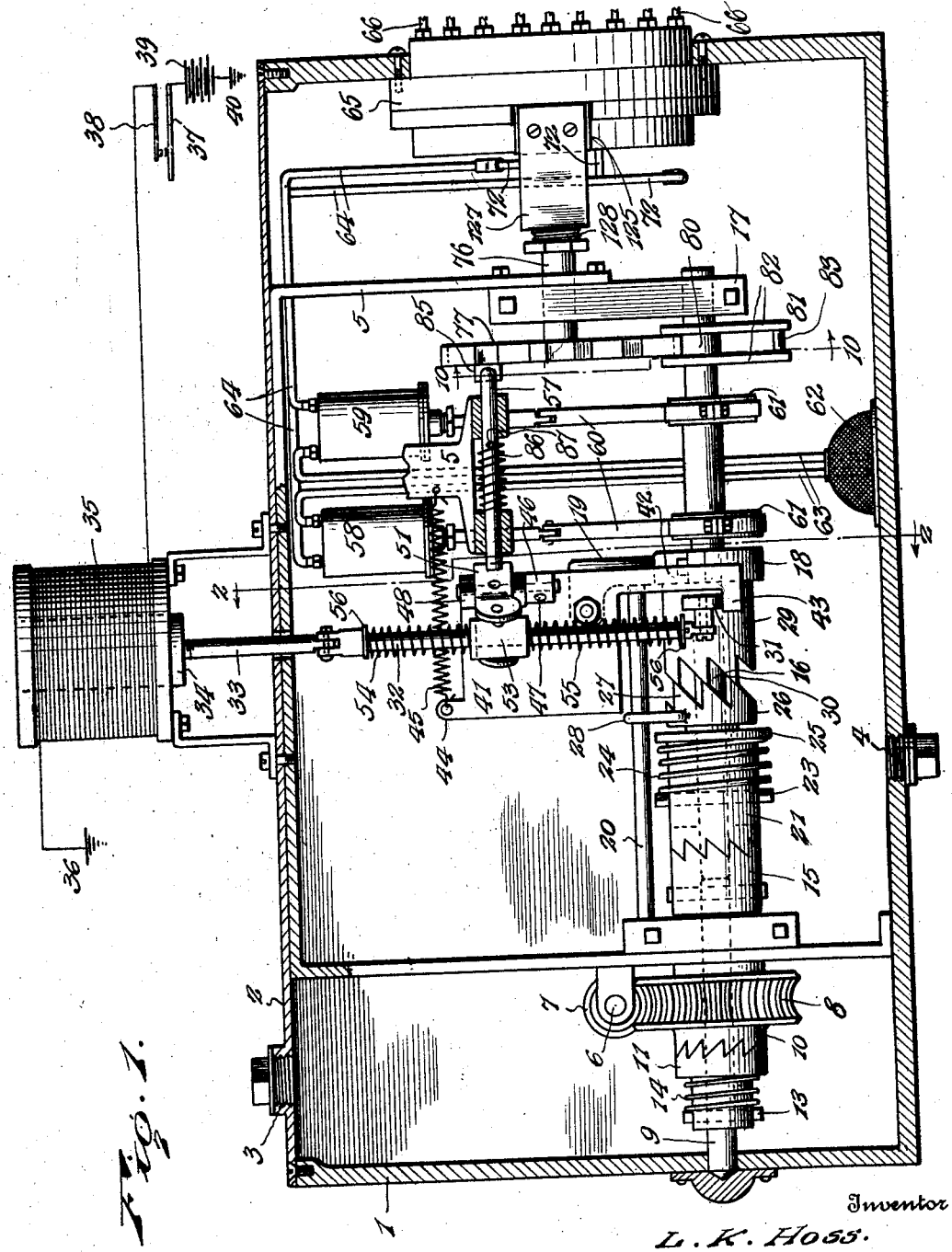

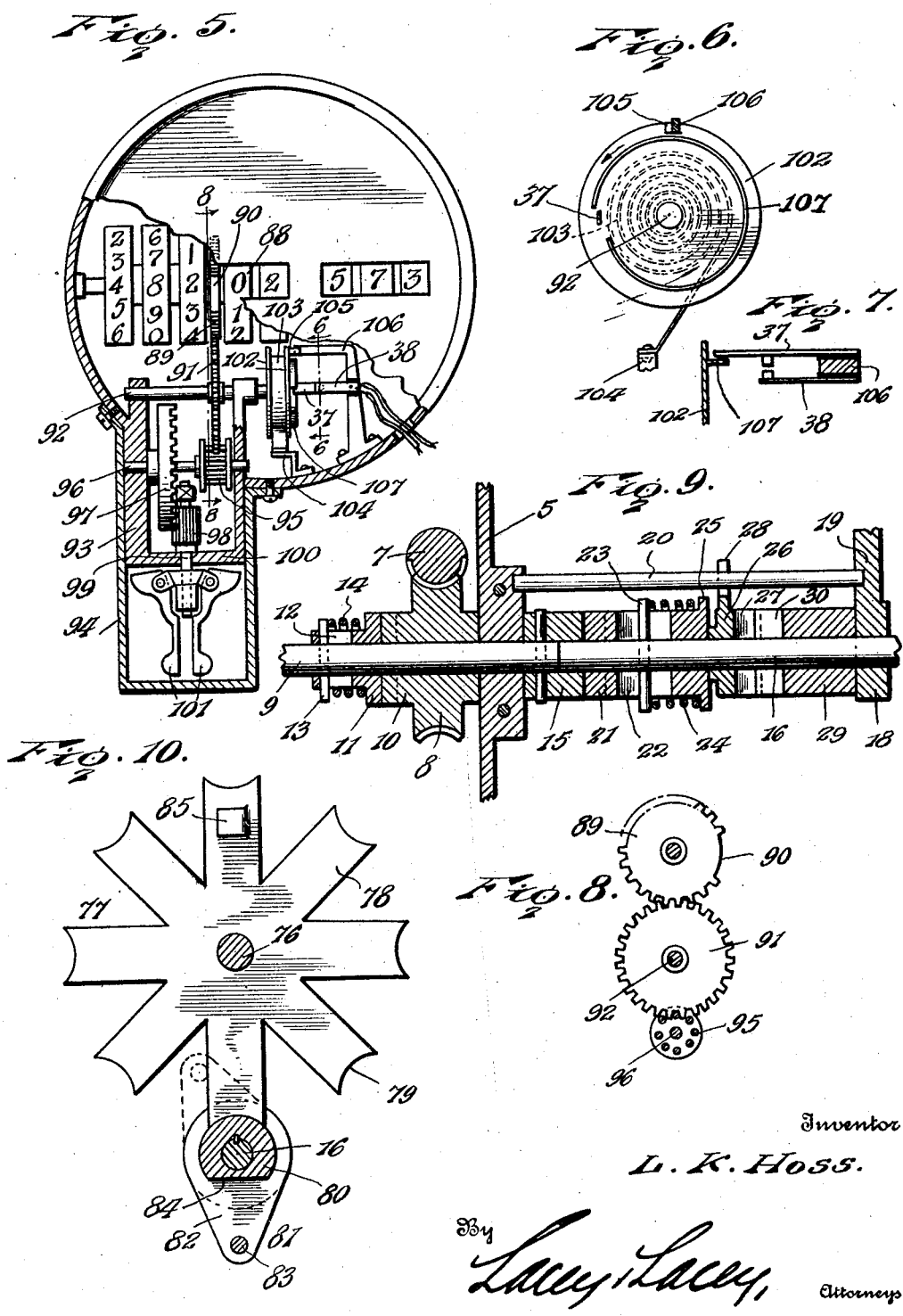

Nov. 29, 1932.  L. K. HOSS  1,889,068
LUBRICATOR
Filed Sept. 5, 1931    5 Sheets-Sheet 4
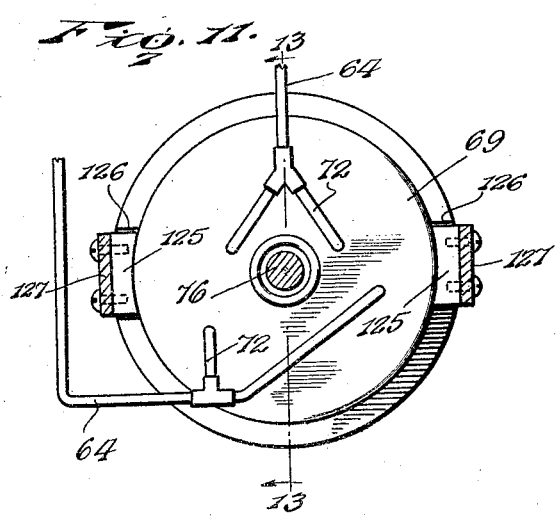
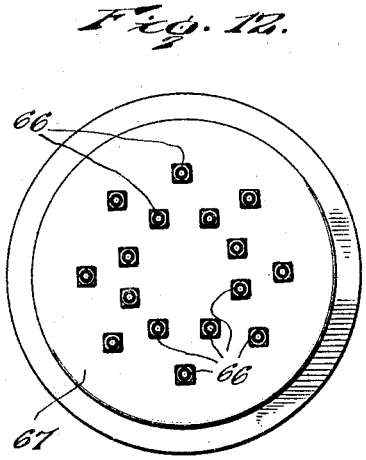
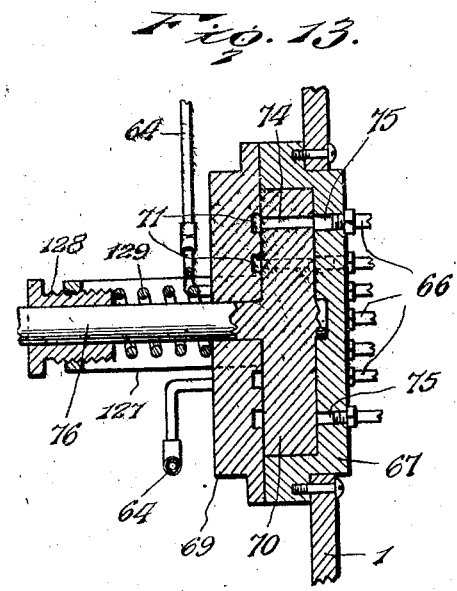
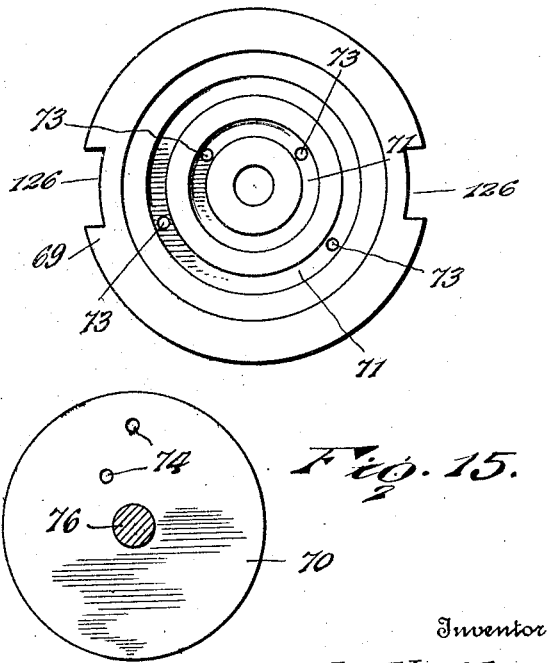
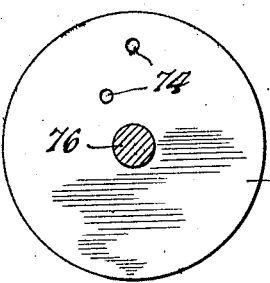

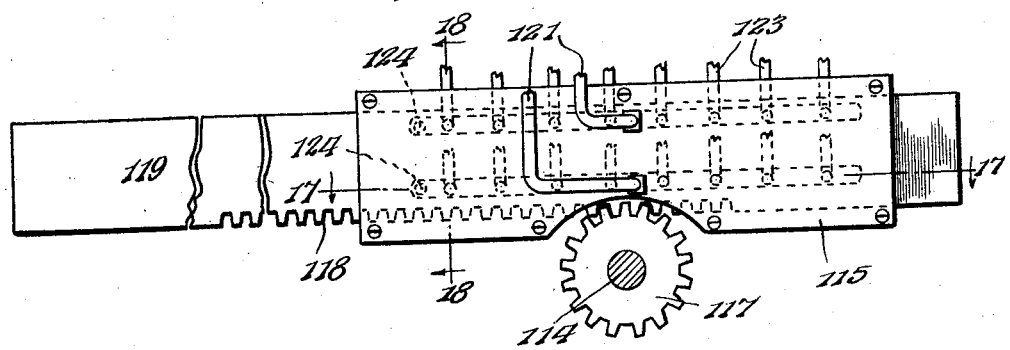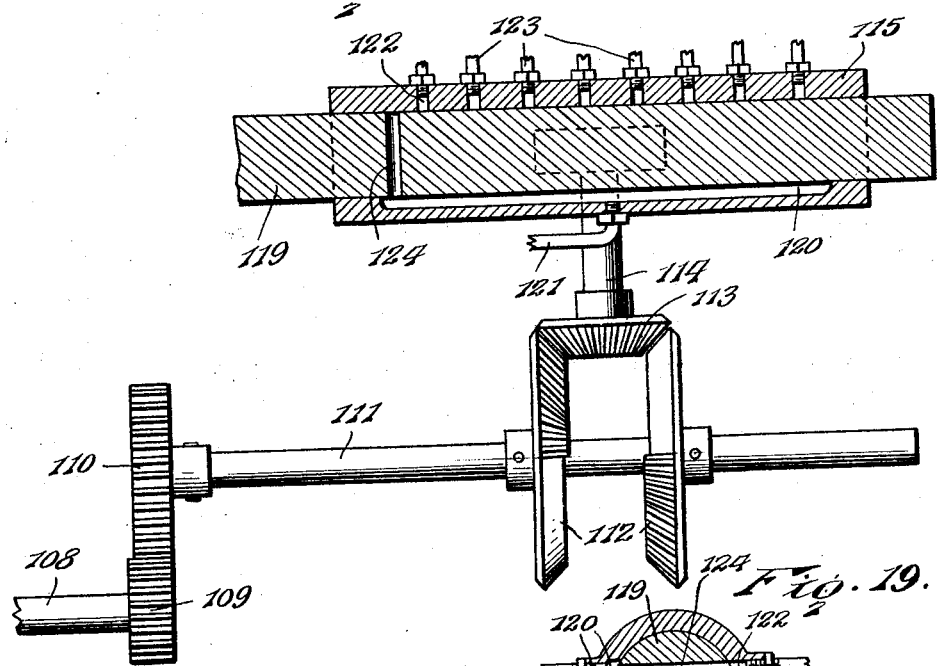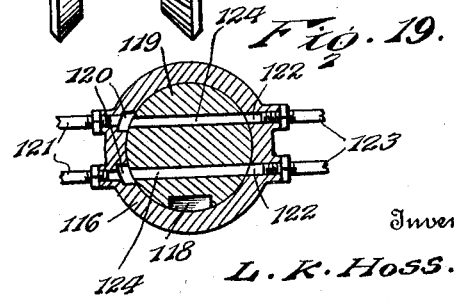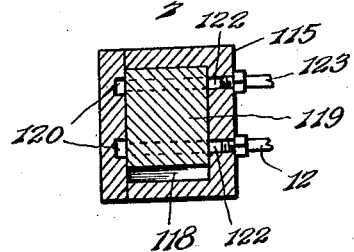

Patented Nov. 29, 1932

1,889,068

UNITED STATES PATENT OFFICE

LEROY K. HOSS, OF DELRAY BEACH, FLORIDA

LUBRICATOR

Application filed September 5, 1931. Serial No. 561,451.

The object of this invention is to provide novel and efficient means whereby bearings in machinery may be periodically automatically lubricated. While the invention is adapted for use in connection with any machinery in which periodical lubrication is desirable, it is intended more particularly for use upon automobiles and will be described as applied to an automobile, as a matter of convenience. The invention is illustrated in the accompanying drawings and will be hereinafter first fully described and then more particularly defined in the appended claims.

In the drawings,

Figure 1 is an elevation, partly in section, of a mechanism embodying the invention, the electric circuit, which is periodically closed in order to effect operation, being diagrammatically shown, Fig. 2 is a transverse section on the line 2—2 of Fig. 1, Fig. 3 is an enlarged detail perspective of a portion of a latch mechanism, Fig. 4 is a detail of the pivoted blocks shown in Fig. 3, Fig. 5 is a sectional elevation of the circuit-closing mechanism, Fig. 6 is a detail section on the line 6—6 of Fig. 5, Fig. 7 is a detail plan view of the circuit closer, Fig. 8 is a detail section on the line 8—8 of Fig. 5, Fig. 9 is a longitudinal axial section of the driving mechanism, Fig. 10 is a sectional elevation on the line 10—10 of Fig. 1, Fig. 11 is an elevation of the inlet side of the oil-distributer, Fig. 12 is a similar view showing the discharge side of the oil-distributer, Fig. 13 is a vertical section on the line 13—13 of Fig. 11, Fig. 14 is an elevation showing the inner face of one member of the oil-distributer casing, Fig. 15 is a detail elevation of the oil-distributing disk, Fig. 16 is a top plan view of an oil-distributer in which the controlling element is reciprocated instead of rotated, Fig. 17 is a section on the line 17—17 of Fig. 16, Fig. 18 is a detail section on the line 18—18 of Fig. 16, and Fig. 19 is a detail section similar to Fig. 18 but showing a modification.

In the drawings, the reference numeral 1 indicates a tank or reservoir which contains the oil and houses the operating mechanism. This tank may be of any approved form and dimensions and may be mounted upon or adjacent the machine which is to be lubricated in any convenient manner. When the invention is applied to a motor vehicle, the tank will generally be secured upon the chassis under the hood and adjacent the power plant of the vehicle so as to be easily coupled to the motor to be driven thereby. The top 2, which may be removable, is equipped with a filling plug 3 and in the bottom of the tank is a drain plug 4. Of course, if preferred, the top may be fixed in place and an end or side of the tank be made removable to permit access to the interior when necessary. Within the tank is secured a frame 5 of suitable form and dimensions, upon which the working mechanism is supported. Upon the frame 5, adjacent one end of the tank, are suitable bearings for a shaft 6 which extends through the side of the tank and, within the tank, is formed with or equipped with a worm 7. The worm 7 meshes with a worm gear 8 which is loose upon a shaft 9 having one end journaled in the adjacent end wall of the tank and having its inner end mounted in a bearing provided therefor upon the end of the frame 5. The worm gear 8 has a clutch hub 10 which, at its inner end, bears against the side of the frame 5, as shown clearly in Fig. 9, and, at its opposite end, is arranged to engage a clutch sleeve or collar 11 which is slidably mounted upon the shaft 9. The clutch sleeve or collar 11 is constructed with a longitudinal slot 12 through which passes a pin 13 which is fixed in the shaft 9, so that while the clutch sleeve may slide on the shaft it is constrained to rotate therewith. An expansion spring 14 is coiled around the clutch sleeve between the head of the same and the said pin 13 and yieldably holds the head of the clutch sleeve in engagement with the clutch hub 10. The shaft 6 rotates constantly when the motor is running and, of course, will drive the worm gear 8 constantly, so that motion will be transmitted through the clutch hub and the clutch sleeve to the shaft 9. Should the motor reverse, or tend to reverse, or otherwise tend to reverse the direction of rotation of the worm gear, the engaging clutch faces will serve as cams to overcome the force of the spring 14 which will yield and permit the clutch sleeve to move out of operative engagement with the clutch hub so that the shaft 9 will not be reversely rotated. Upon the inner end of the shaft 9 is fixed a clutch collar 15 which projects somewhat beyond the end of the shaft and receives the end of the alined driven shaft 16 which is thereby journaled within the clutch 15 and extends inwardly to a bearing block 17 which is provided upon the frame 5. Intermediate the ends of the frame 5, a bearing 18 is fixed thereon and receives an intermediate portion of the shaft 16, and an arm 19 rises from said bearing 18, as shown in Fig. 2, a stationary guide rod 20 being carried by and extending between said arm and the end of the frame. A clutch sleeve 21 is mounted on the shaft 16 and has its clutch face presented to the clutch face of the clutch collar 15 to mesh therewith, said clutch sleeve 21 being provided with a longitudinal slot 22 through which passes a pin or key 23 which is fixed in the shaft 16, as shown clearly in Fig. 9. An expansion spring 24 is coiled around the clutch sleeve between said pin and a flange 25 at the inner end of the sleeve, so that while the sleeve may slide upon the shaft 16 it is constrained to rotate therewith. Immediately adjacent and bearing against the inner end of the clutch sleeve 21, a cam collar 26 is mounted upon the shaft 16 and is provided, at the side remote from the clutch sleeve 21, with cam faces 27. A fork 28 rises from the cam collar 26 and spans the guide rod 20 so that while said collar may slide along the shaft 16 it is held against rotation, it being understood that said collar is loosely mounted upon the shaft. A second cam collar 29 is loosely mounted upon the shaft 16 and is constructed with cam faces 30 presented to and adapted to ride on the cam faces 27 so that the cam member 26 may be slid along the shaft 16 to move the clutch sleeve 21 into engagement with the clutch collar 15, whereupon rotation will be imparted to the driven shaft 16, as will be understood. The cam sleeve 29 cannot slide along the shaft 16 inasmuch as one end thereof rests against the bearing 18, and its opposite end is in engagement with the cam faces of the cam collar 26. The operating cam sleeve 29, however, may turn about the shaft 16 and is turned thereabout, as will presently appear, so that when the high parts of the engaging cam faces 27 and 30 are together, the cam collar 26 is pushed laterally and the clutch sleeve 21 is held in engagement with the clutch collar 15. When the low parts of the cam faces 27 and 30 are together, the spring 24 is permitted to expand and thereby disengage the clutch elements 15 and 21.

A handle or lever arm 31 is formed on or rigidly secured to the cam member 29 and extends therefrom, the outer end of said arm being pivoted to the lower end of a lifting rod 32 which extends toward and terminates below the top of the tank and has its upper end pivoted to the depending stem 33 of a plunger 34 which constitutes the core of an electro-magnet 35 supported in any convenient manner upon the top of the tank. One end of the winding of the magnet 35 is grounded, as shown at 36, and the other end thereof extends to one member 38 of a circuit closer, the co-acting member 37 of said circuit closer being electrically connected to one side of a battery or generator, indicated at 39, the opposite side of the battery being grounded, as indicated at 40.

A latch plate 41 is pivoted upon the upper end of the arm 19 to swing in a vertical plane parallel with the shaft 16, and has a depending extension 42 provided at its lower extremity with a lip 43 which is adapted to engage under the arm or handle 31 and thereby support the same in its raised position, as shown in Figs. 1 and 3. The latch plate 41 is provided at its upper end with a lug 44 to which is attached one end of a contractile spring 45 which has its opposite end secured to a part of the frame 5 so that it tends constantly to swing the latch plate about its pivot in such manner that the shoulder or lip 43 will engage under the arm 31 to support the latter. Above the pivotal point of the latch plate, a lug or block 46 is mounted thereon by a pivotal support 47, and on the upper side of this block or lug 46 is a vertically disposed block 48 which may turn about a vertical pivot 49. In the edge of the latch plate, immediately adjacent the block 48, is a notch or recess 50. Pivoted upon the side of the block 48 to swing in a vertical plane is a shutter arm 51 which has one end arranged to extend over and cover the notch 50 and its opposite end formed into a fork or yoke 52 which spans the lifting rod 32 and is pivotally attached to an enlargement or block 53 carried by said lifting rod. Springs 54 and 55 are coiled around the lifting rod between the upper and lower ends, respectively, of the block or sleeve 53 and washers or other abutments 56 provided at the ends of the lifting rod. When the electro-magnet 35 is energized, the lifting rod 32 will, of course, be raised and the arm 31 will be moved to the position shown in Fig. 1 where it may be supported by the lip 43. The lower spring 55 will be compressed when the lifting rod is raised and will then serve by its expansion to rock the shutter arm 51 into the position shown in Fig. 1 and in Fig. 3, extending over the notch 50 and into the path of a push rod 57, whereupon the latch plate 41 will be held in the position shown in Fig. 1 by the spring 45. When the magnet is deenergized, the lifter rod will be held in the raised position until the latch releases it as hereinafter explained.

Pumps 58 and 59 are mounted in the upper portion of the tank and supported in any convenient manner upon the frame 5, and these pumps are of the reciprocating type and driven by pitmen 60 extending from their respective piston or plunger rods and driven by eccentrics 61 secured upon the shaft 16. In the bottom of the tank is a screen 62 fitted around the ends of the intake or suction pipes 63 which lead to the intake ports of the respective pumps so that upon the suction stroke of the pumps oil will be drawn thereinto and impurities in the oil will be filtered therefrom by the screen. The outlet pipes 64 extend from the pumps to the oil-distributer, indicated as an entirety by the numeral 65, and from the oil-distributer the oil is carried through delivery pipes 66 to the several bearings, it being understood that the delivery pipes may be provided in a number corresponding to the number of bearings to be lubricated.

In the form of the invention illustrated in Figs. 1 and 11 to 15, the oil distributer comprises a cylindrical casing having one member 67 secured within an opening in the end of the tank, a mating member 69 which is held to the member 67, and a rotatable distributing disk 70 which is housed by said members 67 and 69, as shown in Fig. 13. The member 69 is provided in its inner face with circular grooves 71, and the pump discharge pipes 64 are forked at their ends immediately adjacent the distributer, as shown at 72, to communicate with the respective grooves through openings 73 provided through the member 69, as will be understood. The distributer disk 70 is provided with openings or ports 74 therethrough which serve to successively aline with outlet ports 75 in the casing member 67 so that the oil will be forced into the delivery pipes 66. The disk 70 is formed integral with or rigidly secured upon an end of a shaft 76 which extends through the casing member 69 and through the bearing block 17 and is equipped with a star wheel 77. The various arms 78 of the star wheel, as shown clearly in Fig. 10, have concave seats 79 in their ends which conform in radius to the radius of the hub 80 of a pinion 81 which is secured upon the shaft 16 in the vertical plane of the star wheel. The pinion 81 comprises side or cheek plates 82 which are adapted to pass at opposite sides of the end of an arm 78 of the star wheel, as shown in Fig. 1, and are extended laterally to receive a cross pin 83 located eccentric to the hub 80 and, at its side presented to said pin, the hub is cut away segmentally, as indicated at 84, whereby it will periodically be disengaged from the star wheel. Upon referring to Fig. 10, it will be seen that the rotation of the shaft 16 will carry the pin 83 once in each revolution of said shaft into engagement with an arm 78 of the star wheel and will, consequently, move the star wheel through a part of a revolution. When the pin 83 is in engagement with an arm 78, the plane face 84 of the hub will be presented to the end of the arm and, therefore, there will be no obstruction to the rotation of the star wheel, but as the pin clears the star wheel, the longer arcuate portion of the hub will engage the concave seat in the end of the arm, as shown by the full lines in Fig. 10, and the star wheel and distributer disk 70 will be locked and cannot move until the segmental reduced portion 84 of the hub is again presented to the end of the arm.

Upon reference to Fig. 13, it will be noted that the outer member 67 of the oil-distributer casing has a circular recess in its inner face and the disk 70 fits closely but rotatably within the recess while the inner casing member 69 bears against the member 67 and the inner face of the disk without being secured to the member 67. At diametrically opposite points on the periphery of the member 67, projections 125 are provided thereon and project inwardly therefrom to engage in correspondingly located notches or recesses 126 in the periphery of the member 69, the latter being thereby prevented from rotating with the disk. A yoke 127 is secured to and projects inwardly from the projections 125 and in the outer end of the yoke a sleeve 128 has threaded engagement, the shaft 76 passing through and rotating in said sleeve and a pressure spring 129 being disposed about the shaft between the sleeve and the distributer casing to hold the member 69 against the member 67. By adjusting the sleeve, the tension of the spring may be regulated, and when the proper adjustment has been effected the casing members will be held so closely together that leakage of oil will not occur but if excessive pressure should be built up in the distributer, the spring will yield, permitting the casing members to separate whereupon the surplus oil will escape into the tank.

Upon one arm of the star wheel is a cam projection 85 which, at the end of a revolution of the star wheel, will ride against an end of the push rod 57, as shown in Fig. 1, and will thereby impart a sliding movement to said rod against the tension of the expansion spring 86 which is coiled around the rod between one bearing of the same and a pin or abutment 87 on the rod. At this time the shutter arm 51 will be presented to the push rod so that the sliding action of the push rod will apply sufficient force to the latch plate 41 to overcome the spring 45 and rock the plate to move the lip 43 from under the arm 31, whereupon said arm and the rod 32 will drop, releasing the cam member 26 and permitting disengagement of the clutch members 15 and 21. The shutter arm will be simultaneously rocked from the path of the push rod 57, so that when the arm 31 is again raised the spring 45 may rock the latch plate to carry the lip 43 under said arm 31 to support the same, as previously stated, the end of the push rod entering the notch 50 when the latch plate is thus rocked. While the push rod is in engagement with the notch 50, the shutter arm 51 will rest on the push rod 57 and when the rod is subsequently withdrawn the shutter arm will drop to again cover the notch. It will now be understood that when the magnet is energized the arm 31 is raised and the clutch members 15 and 21 engaged, so that the shaft 16 will be rotated. The magnet may be immediately deenergized, as the operative engagement of the clutch members 15 and 21 will continue until the cycle of operations has been completed and the lip 43 withdrawn from under the arm 31. While the shaft 16 is rotating, the pumps are operated and the star wheel 77 is intermittently rotated, as described, the wheel being in motion during about one-third of a revolution of the shaft 16 and being locked against movement during two-thirds of a revolution of said shaft. During a period of rest of the star wheel, the pumps will discharge and the additional oil thereby fed into the oil-distributer will pass through the ports of the distributer disk into the alined ports of the casing and pass out through the corresponding delivery pipes 66 to the bearings to be lubricated. During the period of rotation of the star wheel, the pumps will be taking in an additional supply of oil, and the distributer disk will move a distance corresponding to the movement of the star wheel so that the ports in the disk will be moved from the ports through which oil has just been discharged to the next successive ports, whereby upon the ensuing discharge stroke of the pumps oil will be discharged through said succeeding ports. The star wheel is at rest during the entire discharge stroke of the pumps and also at the beginning and the end of the suction stroke. The cam projection 85 releases the push rod 57 just after the beginning of a greasing operation and reengages the rod at the end of the operation.

As heretofore stated, the apparatus is intended more particularly for use upon automobiles, and the circuit closer is arranged to be manipulated by the odometer with which all automobiles are equipped. A portion of such an odometer is illustrated conventionally in Fig. 5 and may be of any well-known type. In adapting the odometer to operate in connection with and as a part of the present invention, the tens-counting disk 88 of the odometer is reduced in thickness sufficiently to have a gear wheel 89 fixed to one side of the same. At one point in the periphery of this gear wheel, three teeth are removed therefrom, as indicated at 90, and within the odometer casing, below the counting disks and the mutilated gear 89, a gear wheel 91 is provided to mesh with said mutilated gear and is carried by a shaft 92 mounted in suitable bearings in a frame 93 which is secured within the odometer casing and an extension 94 of the latter. The gear 91 meshes in turn with a pinion 95 disposed within the frame 93 below the gear wheel 91, and said pinion 95 is carried by a shaft 96 which also carries a crown gear 97. The crown gear 97 meshes with a pinion 98 at the upper end of a governor shaft 99 which is journaled in a horizontal partition 100, forming the lower end of the frame 93, and in any convenient bearing provided to receive the upper extremity of the shaft. Upon the lower end of the governor shaft are pivoted governor arms 101 which, as the governor shaft is rotated, tend to swing outwardly and upwardly so as to bear against the underside of the partition and ride frictionally thereon to retard the movement of the shaft 92. The shaft 92 is extended beyond one side of the frame 93, and upon the extension of the shaft is secured a casing or pair of plates 102 between which is disposed a volute spring 103 having one end anchored upon the shaft 92 and its opposite end upon a post 104 or other convenient point within the odometer casing. Upon one of the plates 102 is a projection or lug 105 which is adapted to impinge against the end of a post or bracket 106 in the odometer casing and thereby limit the movement of the shaft 92 under the influence of the spring. The casing, or one plate, 102 has an eccentric or spiral rib or flange 107 on its outer face which is adapted to engage the contact arm 37 and move it into engagement with the contact arm 38 to close the circuit through the electro-magnet 35. The contact members 37 and 38 are resilient and are preferably leaf springs which are secured to opposite sides of the post 106 and insulated therefrom. The member 38 is shorter than the member 37, as shown in Fig. 7, so that upon movement of the plate 102 in one direction, the member 37 will be engaged by the inner side of the rib 107 and moved away from the member 38 and, upon the return movement, will be engaged by the outer side of the rib and pressed against the member 38 and close the circuit, as will be understood upon reference to Figs. 6 and 7. During the travel of the vehicle, the odometer operates in the usual manner to register the mileage traveled. The mutilated portion 90 of the gear 89 is so located that each time the tens-counting disk 88 makes one complete revolution, said mutilated portion will be presented to the gear 91, but at all other times the gears 89 and 91 will be in mesh. Consequently, while the vehicle is traveling 100 miles, the shaft 92 will be rotating to wind the spring 103, and the lug 105 will be carried away from the post or bracket 106. The rotation of the gear 91 will be obviously transmitted directly to the shaft 92 so that the cam rib 107 will be carried past the resilient contact member 37 and will clear the same. When the mutilated portion 90 is presented to the gear 91, said gear obviously will be free and the spring 103 immediately proceeds to expand and unwind so that the shaft 92 will be rotated in the reverse direction until it is arrested by the lug 105 impinging against the stop lug 106. The rib or cam flange 107 will, consequently, be caused to engage the spring contact member 37 and carry it to and against the contact member 38 to close the circuit, and the contact members will be held together until the rib 107 clears the member 37 sufficiently to permit said member to spring away from the member 38. The governor arms 101 will retard the return movement of the shaft 92 and the cam rib so that the contact members will be held together for an interval long enough to insure complete energization of the magnet.

In Figs. 16 to 19, I have illustrated a form of oil-distributer in which the receiving and delivering pipes are intermittently placed in communication by a reciprocating controlling member instead of a rotating member. The numeral 108 denotes a shaft corresponding in all respects to the shaft 76 in the first-described form and equipped with a star wheel identical with the star wheel 77. The shaft 108, however, does not extend into the oil-distributer casing to carry an oil-distributer disk but is equipped with a pinion 109 meshing with a gear 110 on a counter shaft 111, the pinion 109 having a ratio of 1 to 2 of the gear 110. Upon the counter shaft are mounted bevel gears 112 which have teeth upon one-half of their peripheries only, the teeth upon one gear being opposite the blank portion of the other gear so that the gears operate alternately. The gears 112 alternately mesh with a bevel gear 113 on the end of a shaft 114 which extends to a point adjacent the oil-distributer casing or box 115 which may be cylindrical, as shown in Fig. 19 at 116, or may be of rectangular cross section, as shown in Fig. 18. The shaft 114 is equipped with a pinion 117 meshing with a rack 118 on a slide or bar 119 which fits closely within the distributer casing. Upon one side of the distributer casing, on the inner face thereof, are grooves 120 into which the pipes 121, leading from the discharge side of the pumps, convey oil from the pumps. The opposite side of the casing is formed with a plurality of ports 122 which receive the ends of the delivery pipes 123 leading to the bearings to be lubricated, and the slide 119 has ports 124 formed therethrough to establish communication between the grooves 120 and the respective ports 122, as will be understood. During the discharge stroke of the pumps, the slide 119 will be at rest, with the ports 124 alined with ports 122, and during the intake stroke of the pumps the slide will be moved from the alined ports to the next succeeding ports, so that the oil will be discharged through the several ports successively. The several gears are so proportioned that a complete revolution of the shaft 108 will carry the shaft 111 through one-half of a complete revolution and, at each movement of the slide, it moves a distance equal to the distance between any two successive ports 122. As the slide passes from ports 122 at the end of the series of said ports, it will be moved a distance equal to one-half the distance between adjacent ports 122 and the gear 113 will then be reversed, so that upon continued travel of the shaft 111 the travel of the slide will be reversed and the ports 124 brought back to aline with the end ports 122. Each gear 112 moves the gear 113 through one complete revolution.

Having thus described the invention, I claim:

1. In apparatus for the purpose described, a supply tank, an oil-distributer, means for delivering oil from the distributer to parts to be lubricated, means controlled by the machine to be lubricated for delivering oil from the tank to the distributer and intermittently operating the distributer, means controlled by the machine to be lubricated for periodically activating the last-mentioned means, and means for retarding movement of said activating means.

2. In apparatus for the purpose set forth, a supply tank, an oil-distributer, means for delivering oil from the distributer to parts to be lubricated, means for delivering oil from the tank to the distributer and intermittently operating the distributer, and means for automatically controlling the last-mentioned means, said controlling means including an electro-magnet, contact elements in circuit with the electro-magnet, one of said contact elements extending beyond the other of said elements, a mutilated gear driven by the machine to be lubricated, a gear arranged to mesh with the mutilated gear to be driven thereby, a spring connected with said last-mentioned gear to be wound thereby and to impart reverse motion to the gear when the mutilated portion of the mutilated gear is presented thereto, a shaft carrying said gear and to which the spring is attached, means for limiting reverse movement of said shaft under the influence of the spring, an element movable with said shaft and arranged to ride past the longer contact element when moved in one direction and to move said contact in engagement with the shorter contact upon movement in the reverse direction, and means for retarding the reverse movement.

3. In apparatus for the purpose described, a constantly rotating driving member, a shaft to be driven by said member, yieldable means for coupling the shaft to the member whereby upon reverse movement of the driving member the shaft will be uncoupled, a driven shaft alined with the first-mentioned shaft, means for periodically coupling the driven shaft to the first-mentioned shaft, and oil-distributing means driven by the second-mentioned shaft.

4. In apparatus for the purpose set forth, an oil-distributer including a movable member to control the flow of oil through the distributer, a shaft operatively connected with said member, a star wheel secured on said shaft having concave seats at the ends of its several arms, a driving shaft, a pinion on said shaft including a segmental hub adapted at times to rest in said seats and lock the star wheel at rest and having a pin eccentric to said hub to engage the arms of the star wheel successively as they are released by the hub and thereby impart intermittent movement to the star wheel, means for periodically setting said shaft in operation, and means controlled by the star wheel for arresting the movement of said shaft.

5. In apparatus for the purpose set forth, a constantly rotating driving member having a clutch hub, a shaft concentric with said member, a clutch collar slidably yieldably mounted on said shaft and constrained to rotate therewith and adapted to engage the clutch hub of the driving member, a clutch collar secured on said shaft, a driven shaft alined with the first-mentioned shaft, a clutch sleeve yieldably slidably mounted on the driven shaft and constrained to rotate therewith, a cam member mounted loosely on the driven shaft, means for preventing rotation of said cam member, a second cam member loosely mounted on the driven shaft and engaging the first-mentioned cam member, an oil-distributer, means driven by the second-mentioned shaft for intermittently driving the oil-distributor, and means for periodically rocking the second-mentioned cam member whereby the clutch sleeve and clutch collar will be engaged and the driven shaft rotated.

6. In apparatus for the purpose described, a driving shaft, a driven shaft alined therewith, an oil-distributer, means for operatively connecting the driven shaft with the oil-distributer and including a rotatable gear, a cam projection on the side of said gear, a clutch collar on the driving shaft, a clutch sleeve slidably mounted on the driven shaft and constrained to rotate therewith and adapted to engage the clutch collar, yieldable means tending constantly to hold the clutch sleeve out of engagement with the clutch collar, a cam member loosely mounted on the driven shaft and bearing against the clutch sleeve, means for preventing rotation of said cam member, a second cam member loosely mounted on the driven shaft and bearing against the first-mentioned cam member whereby when the second-mentioned cam member is rocked the clutch sleeve will be engaged with the clutch collar, an arm projecting from the second-mentioned cam member, means connected with said arm for periodically lifting the same to effect operation of the driven shaft, a latch plate pivotally mounted above the driven shaft and having a depending extension and adapted to engage under said arm to hold the same in its raised position, a push rod having one end disposed in the path of the projection on the gear actuated by the driven shaft, yieldable means for holding the push rod in said path, and means whereby the engagement of the projection with the push rod will rock the latch to release the arm on the second-mentioned cam member.

7. In apparatus for the purpose set forth, an oil-distributer, a driven shaft operatively connected with the oil-distributer for actuating the same, said operative connections including a gear having a cam projection on one side, means for rotating the driven shaft, means for detachably coupling the driven shaft with said rotating means and including a cam member loosely mounted on the shaft to turn about the same and provided with a lateral arm, a lifter rod pivoted to said arm, means for periodically raising said lifter arm, a latch pivotally mounted above said arm and having an extension adapted to project under the arm to hold it in raised position, a shutter arm pivotally mounted upon the latch and connected with the lifter arm, and a push rod slidably mounted between the gear and said shutter arm whereby when the push rod is engaged by the projection on the gear the latch will be rocked to release the arm on the cam member.

8. In apparatus for the purpose set forth, an oil-distributer, a shaft, means driven by said shaft for intermittently operating the oil-distributer, means for rotating said shaft, means for detachably coupling the shaft to said rotating means, a cam member loosely mounted upon the shaft to turn about the same and controlling the coupling means, an arm projecting from said cam member, a lifter rod pivoted to said arm, means for periodically raising said lifter rod for raising the arm, a latch member pivoted above the arm and having an extension arranged to engage under the arm and hold it in raised position, said latch having a notch in one edge in its upper end portion, a block pivoted upon the latch below said notch for movement about a horizontal axis, a block pivotally mounted on top of the first-mentioned block for movement about a vertical axis, a shutter arm pivotally mounted upon the second-mentioned block for movement about a horizontal axis and having one end adapted to extend over the notch in the latch and its opposite end forked to span the lifter rod, a sleeve on the lifter rod pivoted within the forked end of the shutter arm, abutments above and below said sleeve, expansion springs disposed between said abutments and the sleeve, yieldable means tending constantly to move the latch into position to support the arm on the cam member raised, a push rod slidably mounted between the latch and the gear connected with the oil-distributer and disposed in the path of the projection on said gear with its opposite end presented to the shutter arm whereby when the projection on the gear engages said push rod the latch will be rocked to release the arm on the cam member and the shutter arm will be rocked to permit the end of the push rod to enter the notch in the latch plate on return movement of the latch plate.

In testimony whereof I affix my signature.

LEROY K. HOSS. [L. S.]